Patented Jan. 30, 1934

1,945,055

UNITED STATES PATENT OFFICE 1,945,055

METHOD OF MAKING A RUBBER ARTICLE

Evelyn William Madge, Erdington, Birmingham, England, assignor to Dunlop Rubber Company, Limited, Birmingham, England, a British company No Drawing. Application August 19, 1930, Serial No. 476,447, and in Great Britain September 19, 1929

8 Claims. (Cl. 154—2)

This invention relates to rubber articles such as light weight rubber board suitable for use in aeroplane and speed-boat constructions and for other purposes in which lightness and strength and rigidity are required. The invention also relates to a method of forming boards of the above character from rubber or rubber-like material.

An object of the invention is to provide a board of low density or low specific gravity and that is strong and water-proof. Other objects of the invention are to provide a method of making boards of the above characteristics and to provide a board of the above type that may be softened and molded at an elevated temperature.

Other objects and features of the invention will appear from the following description. Boards made in accordance with my invention, comprises a sheet of sponge hard rubber or ebonite having dispersed throughout its body minute voids or air spaces, and being thereby light in density or apparent specific gravity, and having integrally united to each of its opposite faces a sheet having a continuous surface as for example a sheet of metal, of ebonite coated metal, of ebonite alone or of ebonite reinforced with fabric or with fabric impregnated with ebonite. Ordinary aeroplane material can also be used for the outside surface.

The sponge ebonite material employed for the intermediate layer may be obtained in any suitable manner from aqueous dispersions of rubber or rubber-like material containing suitable compounding ingredients. A dispersion such as described in the copending patent of Chapman, Pounder and Murphy, No. 1,852,447, April 5, 1932 may be employed. Such compositions contain rubber or similar natural or artificial resins together with sulphur accelerators, oils, pigments and other known compounding ingredients dispersed throughout an aqueous medium and also contain a small quantity of soap, saponin or other suitable frothing agent. A quantity of a gelling agent such as sodium silicofluoride may be added to the composition shortly before the latter is to be set.

An example of the method of my invention is as follows:—

An ebonite mixing of composition—

| | Parts by weight |
|---|---|
| Rubber | 60.5 |
| Sulphur | 29.5 |
| Zinc diethyldithiocarbamate | 0.6 |
| Mineral oil | 6.8 |
| Zinc oxide | 0.5 |
| Lamp black | 1.0 |
| Oleic acid | 0.1 |
| Casein | 0.4 |
| Caustic potash | .6 | is prepared in the form of a latex cream sufficiently viscous and concentrated to prevent the segregation of the compounding ingredients. To the cold cream 1.5 parts of ammonium oleate are added as a frothing agent and the mixture is whipped to a stiff froth in any suitable machine, for example, by means of an egg-whipping attachment of a cake mixing machine. When a froth of sufficiently low density has been obtained 1.5 parts of sodium silicofluoride on the dry mix are added preferably as a 20% emulsion. After further beating for the space of one minute the foam is poured and allowed to set in the cold in suitable trays. Immediately after complete setting the foam is given a short steam cure, stripped from the shallow trays and thoroughly dried.

A suitable fabric is impregnated with the same latex mixing and then allowed to dry.

The light rubber board is built up by cementing the sponge rubber sheets to sheets of the impregnated fabric, the same mixing being used as a cement as is used for the impregnation of the fabric. If desired the mixing used for the cementing of the sponge rubber sheet to the impregnated fabric may be thickened. Any desired thickness of the light rubber board may be obtained by building up a slab in layers alternatively of sponge rubber and impregnated fabric. The built-up slab is then press-cured, a compression of about 30% being made, until the product has the desired properties of rigidity and hardness. Products having a density of 0.4 to 0.5 have been obtained. It has been found that a product having a density of 0.7 to 0.8 has a very good mechanical strength.

An alternative method of building up the light rubber board is as follows:—

Long rolls of cloth are spread thinly with the sponge ebonite froth obtained as hereinbefore described, which froth after gelling and drying is found to adhere firmly to impregnate fabric. The boards are now prepared by doubling the fabric cloth composition, using an intermediary layer of latex mixing as cement if desired, and vulcanizing under pressure.

The emulsions or dispersions comprise by way of example, those consisting of or containing rubber, guttapercha, balata and similar vegetable resins, occurring naturally or artificially obtained and in vulcanized or unvulcanized condition. Aqueous dispersions of coagulated rubber, synthetic rubber, vulcanized rubber, waste or reclaim may also be employed if desired as alternatives or admixtures. Any of the aforesaid dispersions may contain the usual known compounding ingredients. Concentrates such as are obtained in Patent No. 1,846,164, February 23, 1932 to which may be added any one or more of the usual compounding ingredients, preferably excepting those which would tend to form insoluble soaps or to increase the surface tension of the foamy mass, may also be used.

The structure thus obtained is light, strong and water-proof and is suitable for use in aeroplanes, in the construction of the wing covering, fuselage and hull construction and flooring and in the construction of other articles where lightness is desirable. When the structure is made entirely of rubber which softens at the temperature of boiling water the board may be readily shaped by heating to the temperature of boiling water and molded to the desired shape.

What I claim is:—

1. A method of forming a structure of the type described which comprises forming a froth from an aqueous dispersion of rubber and vulcanizing materials in the proportions to form hard rubber, partially vulcanizing said froth, cementing a continuous exterior layer to the faces of said froth, and completing the vulcanizing of said structure.

2. A method of forming a structure of the type described which comprises forming a froth from an aqueous dispersion of rubber and vulcanizing material in the proportions for hard rubber, spreading a cloth with said froth, setting the froth, drying the resulting structure, doubling and cementing said structure together and vulcanizing said structure under pressure.

3. The method of claim 2 in which said structure is cured with a compression of 30%.

4. The method of claim 2 in which the dispersion comprises rubber material and sulphur in approximately the ratio of 2 to 1 and a smaller quantity of oils and pigments and of a frothing agent.

5. The method of claim 2, in which the dispersion comprises rubber and sulphur in an approximate ratio of 2 to 1 by weight, accelerators, mineral oils, pigments and a frothing agent and in which the froth is set with a gelling agent.

6. A method of forming a structure of the type described which comprises forming a froth from a dispersion of rubber and vulcanizing material in quantity sufficient to form hard rubber, partially vulcanizing said froth, drying the resulting porous structure, cementing layers of said dried porous structure to a facing material and vulcanizing the resulting structure to form hard rubber.

7. A method of forming a structure of the type described which comprises forming a froth from a dispersion of rubber and vulcanizing material in quantity sufficient to form hard rubber, partially vulcanizing said froth, drying the resulting porous structure, cementing layers of said dried porous structure to a facing material and compressing said structure and vulcanizing it to hard rubber.

8. A method of forming an ebonite structure which comprises partially curing a foamed compounded rubber dispersion containing sulphur sufficient for ebonite, cementing an impervious exterior layer to a face of said partially cured foam, and vulcanizing said foam under pressure at a temperature sufficient to convert it to ebonite.

EVELYN WILLIAM MADGE.